July 19, 1949.  W. D. BOYNTON  2,476,279

APPARATUS FOR TESTING ELECTRICAL CONTINUITY

Filed Oct. 3, 1944

INVENTOR
W. D. BOYNTON
BY
ATTORNEY

Patented July 19, 1949

2,476,279

UNITED STATES PATENT OFFICE 2,476,279

APPARATUS FOR TESTING ELECTRICAL CONTINUITY

Wentworth D. Boynton, Woodbrook, Md., assignor to Western Electric Company, Incorporated, New York, N. Y., a corporation of New York Application October 3, 1944, Serial No. 556,965

5 Claims. (Cl. 175—183)

This invention relates to testing apparatus, and has for its object the provision of new and improved testing apparatus.

An apparatus embodying the invention comprises means for holding an insulated conductor in an extended position and a test set for testing the continuity of an insulated conductor so held. Means are provided for flexing the conductor while it is being tested.

A complete understanding of the invention may be obtained from the following detailed description of a specific embodiment thereof, when read in conjunction with the appended drawings, in which.

Figure 3:
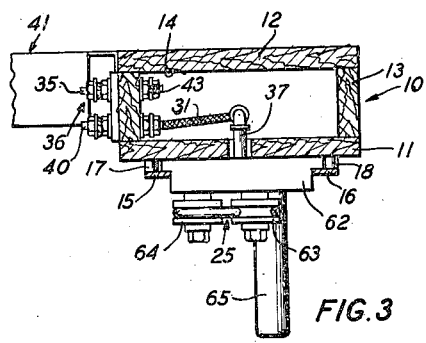
Fig. 3 is a horizontal sectional view taken along line 3—3 of Fig. 1.

Referring more in detail to the drawings, there is illustrated therein an apparatus which serves to test the continuity of conductors and to flex the conductors while they are being so tested. This apparatus comprises a vertical frame 10 (Fig. 1), which includes a pair of uprights 11 and 12 separated by spacers 13—13 (Fig. 3) to form a chamber 14 therebetween. A pair of guide rails 15 and 16 are fastened to the upright 11 by pins 17—17 and 18—18, respectively. The rail 16 is somewhat shorter than the rail 15.

Figure 4:
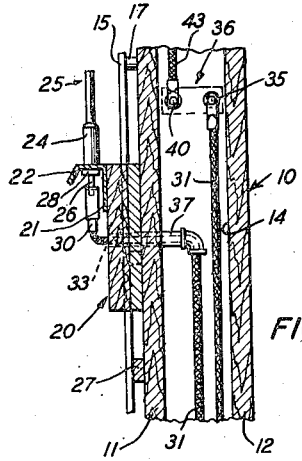
Fig. 4 is a fragmentary, vertical sectional view taken along line 4—4 of Fig. 1.

A weighted block 20 (Figs. 1 and 4) of insulating material is mounted between the guide rails 15 and 16 and is slidable therealong. A metal bracket 21 secured to the weighted block 20 includes an L-shaped flange 22, which has a notch 23 formed therein. A terminal 24, which has a collar 28, of a coaxial cable 25 may be positioned in the notch in the bracket to secure the weighted block to the cable and support the weighted block. A notched bar 27 positioned on one of the pins 17—17 and one of the pins 18—18 serves to support the weighted block when the apparatus is not in use.

A clip 30 (Fig. 4) mounted on the end of an insulated conductor 31 serves to connect electrically to the conductor 31 a terminal post 29 connected to a central conductor in the coaxial cable 25. The conductor 31 is looped and passes through a bore 33 formed in the weight 20 and through a protective L-shaped conduit 37, which passes through a slot 34 formed in the board 11. The other end of the insulated conductor 31, is connected to a terminal 35 (Fig. 4) of a connector 36. The connector 36 also includes a terminal 40, and the terminals 35 and 40 are connected electrically to a test set 41 by a pair of insulated conductors 42—42.

One end of an insulated conductor 43 (Fig. 1) is connected to the terminal 40, and the other end thereof is connected to a metal bracket 44. The metal bracket 44 is mounted on a wooden block 45 and has an L-shaped flange 46 and a notch 50 formed therein. The metal bracket 44 is identical with the metal bracket 21 but is inverted with respect thereto, and the notches 22 and 50 are positioned in vertical alignment. The bracket 44 (Fig. 2) serves to hold a flanged terminal 51, which forms the upper end of the cable 25 and includes a collar 49, whereby the cable 25 is suspended and holds the weighted block 20 out of contact with the notched bar 27. A clip 52 is connected electrically to an insulated conductor 53, and with the conductor 53, serves to connect to the metal bracket 44 a terminal post 57 connected to the upper end of the central conductor (not shown).

The test set 41 (Fig. 1) has a cord 58 connected thereto and the cord 58 has a plug 59 on the free end thereof. The plug 59 can be connected to a suitable source of power (not shown) to energize the test set.

A plate 62 (Figs. 1 and 3) is slidable along the guide rails 15 and 16 above the weight 21. A pair of grooved rollers 63—63 are mounted rotatably on the plate 72 in alignment with each other, and a third grooved roller 64 is positioned between the rollers 63—63 in off-set relationship therewith. A handle 65 (Figs. 1 and 3) secured to the plate 62 may be grasped to move the plate 62 along the guide rails 15 and 16. A spring-biassed latch 66 permits the plate 62 to be slid upwardly past the latch, and serves to support the plate 62 when the plate is moved above the latch. The latch can be actuated manually to permit the plate to be slid downwardly past the latch when desired.

Figure 1:
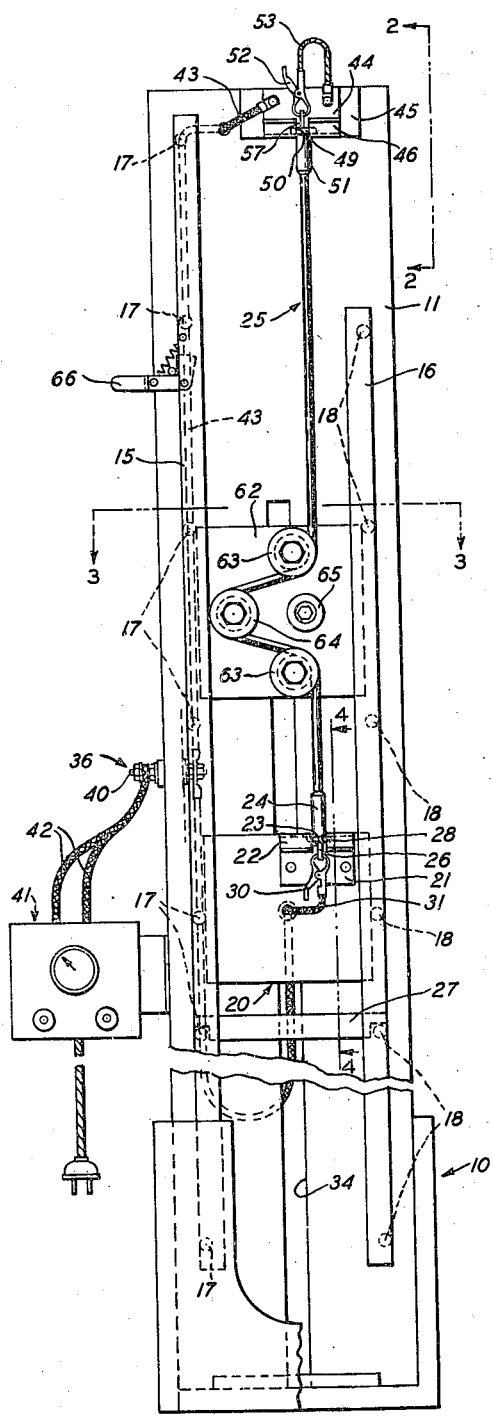
Fig. 1 is a front elevational view of an apparatus embodying the invention.
Figure 2:
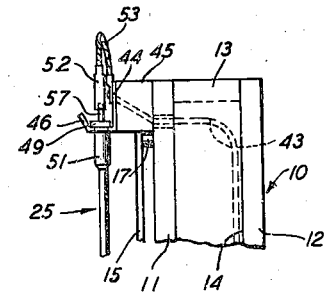
Fig. 2 is a fragmentary, vertical sectional view taken along line 2—2 of Fig. 1.

In the operation of the apparatus described hereinabove, the plate 62 (Fig. 1) is positioned above the latch 66 and is allowed to rest thereon. Then the terminal 51 is positioned in the bracket 44, as shown in Fig. 2, and the clip 52 is connected to the terminal post 57. The intermediate portion of the cable 25 then is positioned over the rollers 63—63 and 64, as shown in Fig. 1. The weighted block 20 then is raised from the bar 27, and the terminal 24 is placed in the slot 23, whereby the cable 25 supports the weighted block and is placed under tension. The clip 30 then is connected to the terminal post 26, and the test set 41 is energized. The test set then supplies an electrical current to the central conductor of the cable 25 through one of the conductors 42—42 to the terminal 35, the terminal 35, the conductor 31, the clip 30, and the terminal post 26, and through the other of the conductors 42—42, the terminal 40, the conductor 43, the bracket 44, the conductor 53, the clip 52, and the terminal post 57. After this the plate 62 is moved downwardly along the guide rails 15 and 16 to the terminal 24, whereby the cable 25 is flexed as the offset rollers 63—63 and 64 move therealong. If any discontinuity is present in the central conductor of the cable, the electric current supplied by the test set 41 to the central conductor will not flow therethrough, which fact will be indicated by the test set 41 at the time the discontinuous portion of the central conductor is flexed by the rollers 63—63 and 64, whereby the discontinuity may be located.

The collars 28 and 49 are connected electrically to a second conductor of the cable 25, which second conductor is other than the above mentioned central conductor, but are insulated from the central conductor. However, the clip 30 does not contact the bracket 21 with which the collar 28 is in contact and the connection from the bracket 44 to the clip 30 is not completed through the collar 49 and the second conductor of the cable 25. Consequently, the second conductor does not interfere with the test of the central conductor.

After the plate 62 (Fig. 1) has been moved to the terminal 24, it is slid upwardly past the latch 66 and is allowed to rest upon the latch. The cable 25, which has been so tested, then is removed from the apparatus and another cable may be inserted and tested as described hereinabove.

The apparatus described hereinabove serves to test the continuity of central conductors, while flexing the conductors and maintains the conductors under tension during the flexing thereof. The flexing of the conductors serves to open any breaks or cracks in the conductors so that this type of discontinuities may be indicated by the test set 41 and located by the positions of the rollers 63—63 and 64 with respect to the cables. Consequently, the apparatus serves to locate not only complete discontinuities but also partial discontinuities in conductors tested thereby.

Obviously, the apparatus may be used to test cables of different lengths merely by sliding the weighted block 20 along the guide rails 15 and 16 until the bracket 21 carried thereby reaches a suitable position. The conductor 32, being looped, is movable in the slot 34, and, consequently, adapts itself to such changes of the positions of the weighted block.

If it is desired to test very short lengths of cables, the plate 62 may be removed from the apparatus between the bracket 44 and the upper end of the guide rail 16. A short cable then is connected to the brackets 44 and 21 and the test set 41 and the test conducted while flexing the short length of cable manually.

What is claimed is:

1. In an apparatus for testing conductors, means for suspending an insulated conductor, means for placing under tension an insulated conductor suspended by the suspending means, staggered conductor-guiding means movable along the conductor for flexing the conductor, and means connectable to the conductor for testing an electrical characteristic of the conductor while it is flexed and tensioned.

2. In an apparatus for testing conductors, a vertical frame, an upper bracket secured to the upper portion of the frame for suspending a terminated coaxial cable, a pair of vertically extending guides, a weight slidable along the guides, a lower bracket for securing to the weight the lower end of a cable suspended from the upper bracket, a plate slidable along the guides, a plurality of rollers mounted on the plate in offset relationship to a straight line between the upper bracket and the lower bracket, means for sliding the plate along the guides, whereby the offset rollers flex the cable, means for testing the continuity of a conductor of the cable, and means for connecting the ends of the conductor to the testing means.

3. In an apparatus for testing conductor, means for extending an insulated conductor between two points, means for deflecting laterally an insulated conductor extended by the extending means, means for moving the flexing means between said points, and means connectable to the conductor for indicating a discontinuity in the conductor.

4. In an apparatus for testing conductor, means for holding an insulated conductor in an extended position, a plurality of grooved rollers, means for mounting the rollers in positions offset to one another and to the conductor holding means, means for moving the last-mentioned means along an insulated conductor extended by the extending means to flex the conductor, means for testing the continuity of the conductor while it is being flexed, and means for connecting the ends of the conductor to the testing means.

5. In an apparatus for testing conductors, a pair of guides forming a guideway, means for extending an insulated conductor along the guideway, means slidable along the guideway, staggered conductor-guiding means carried by the slidable means for flexing an insulated conductor extended along the guideway, means for tensioning the conductor as it is flexed, means for testing the continuity of the conductor, and means for connecting the ends of the conductor to the testing means.

WENTWORTH D. BOYNTON.

REFERENCES CITED

The following references are of record in the file of this patent:

UNITED STATES PATENTS

| Number | Name | Date |
|---|---|---|
| 889,993 | Vaughan et al. | June 9, 1908 |
| 1,882,815 | Haegele et al. | Oct. 18, 1932 |
| 1,927,045 | Parsons | Sept. 19, 1932 |
| 1,967,296 | Dixon et al. | July 24, 1934 |
| 2,393,177 | Longfellow | Jan. 15, 1946 |

FOREIGN PATENTS

| Number | Country | Date |
|---|---|---|
| 121,204 | Great Britain | Dec. 12, 1918 |